United States Patent
Hill, III et al.

(10) Patent No.: US 11,781,417 B2
(45) Date of Patent: Oct. 10, 2023

(54) IDENTIFYING CORROSION FROM ELECTROMAGNETIC CORROSION MEASUREMENTS AND HIGH-RESOLUTION CIRCUMFERENTIAL MEASUREMENTS

(71) Applicant: Halliburton Energy Services, Inc., Houston, TX (US)

(72) Inventors: Freeman Lee Hill, III, Spring, TX (US); Junwen Dai, The Woodlands, TX (US); Ahmed Elsayed Fouda, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/223,821

(22) Filed: Apr. 6, 2021

(65) Prior Publication Data
US 2022/0065094 A1     Mar. 3, 2022

Related U.S. Application Data

(60) Provisional application No. 63/073,844, filed on Sep. 2, 2020.

(51) Int. Cl.
*E21B 47/13* (2012.01)
*G01V 3/30* (2006.01)
(Continued)

(52) U.S. Cl.
CPC ............ *E21B 47/006* (2020.05); *E21B 47/13* (2020.05); *G01V 3/30* (2013.01); *G01V 3/38* (2013.01); *G06N 3/02* (2013.01); *E21B 2200/22* (2020.05)

(58) Field of Classification Search
CPC ........ E21B 47/006; E21B 47/13; E21B 47/00; E21B 2200/22; E21B 2200/00;
(Continued)

(56) References Cited

U.S. PATENT DOCUMENTS

| 4,953,147 A | * | 8/1990 | Cobb ..................... G01N 29/42 73/598 |
| 7,960,969 B2 | | 6/2011 | Mouget et al. |

(Continued)

FOREIGN PATENT DOCUMENTS

| WO | 2019046101 | 8/2017 |
| WO | 2018031045 | 2/2018 |

(Continued)

OTHER PUBLICATIONS

S. M. Haugland, "Fundamental analysis of the remote-field eddy current effect", IEEE Transactions on Magnetics, vol. 32, No. 4, pp. 3195-3211, Jul. 1996.

(Continued)

*Primary Examiner* — Mohamed Charioui
(74) *Attorney, Agent, or Firm* — John Wustenberg; C. Tumey Law Group, PLLC

(57) ABSTRACT

A method for estimating a pipe property for a plurality of nested tubulars. The method may comprise disposing an electromagnetic (EM) logging tool in a wellbore. The electromagnetic logging tool may comprise a transmitter disposed on the electromagnetic logging tool and a receiver disposed on the electromagnetic logging tool. The method may further comprise transmitting an electromagnetic field from the transmitter into one or more tubulars, measuring the eddy current in the pipe string with the receiver on at least one channel to obtain a plurality of measurements, forming an EM log from the plurality of measurements, extracting data and distinct features from the EM log, forming a relationship between the EM log data and a database, wherein the database is formed from one or more high-resolution measurements, and producing a mapping function between the EM log and the database.

20 Claims, 11 Drawing Sheets

(51) Int. Cl.
*G01V 3/38* (2006.01)
*G06N 3/02* (2006.01)
*E21B 47/00* (2012.01)

(58) Field of Classification Search
CPC ... G01V 3/30; G01V 3/28; G01V 3/26; G01V 3/18; G01V 3/38; G01V 3/00; G06N 3/02
See application file for complete search history.

(56) References Cited

U.S. PATENT DOCUMENTS

| | | | |
|---|---|---|---|
| 9,488,749 B2* | 11/2016 | Khalaj Amineh | .... E21B 47/085 |
| 9,715,034 B2 | 7/2017 | Omeragic et al. | |
| 9,977,144 B2 | 5/2018 | David et al. | |
| 9,983,173 B2 | 5/2018 | Aslanyan et al. | |
| 10,502,044 B2 | 12/2019 | Fouda et al. | |
| 10,605,720 B2 | 3/2020 | Amineh et al. | |
| 10,705,242 B2 | 7/2020 | Jaaskelainen et al. | |
| 10,767,470 B2 | 9/2020 | Fouda et al. | |
| 10,823,873 B2 | 11/2020 | Fouda et al. | |
| 10,830,036 B2 | 11/2020 | Samson et al. | |
| 10,895,147 B2 | 1/2021 | Ren et al. | |
| 2017/0322182 A1* | 11/2017 | Zheng | ............... G06F 16/00 |
| 2018/0074220 A1* | 3/2018 | David | ............... G01V 3/38 |
| 2018/0209265 A1 | 7/2018 | Fouda et al. | |
| 2018/0365555 A1* | 12/2018 | Aslam | ............... G06N 3/0436 |
| 2019/0078430 A1 | 3/2019 | Halliburton | |
| 2019/0129057 A1* | 5/2019 | Fanini | ............... G01V 3/38 |
| 2019/0137649 A1* | 5/2019 | San Martin | ............. E21B 47/13 |
| 2020/0003675 A1 | 1/2020 | Halliburton | |
| 2020/0182830 A1 | 6/2020 | Fouda et al. | |
| 2020/0190969 A1 | 6/2020 | Ren et al. | |
| 2020/0200940 A1 | 6/2020 | Fouda et al. | |
| 2020/0271818 A1 | 8/2020 | Fouda et al. | |
| 2020/0309986 A1 | 10/2020 | Donderici et al. | |
| 2020/0319362 A1 | 10/2020 | Guner et al. | |
| 2020/0333500 A1 | 10/2020 | Fouda et al. | |
| 2020/0378240 A1 | 12/2020 | Fouda et al. | |
| 2021/0033742 A1 | 2/2021 | Topping et al. | |
| 2021/0054731 A1 | 2/2021 | Fouda et al. | |

FOREIGN PATENT DOCUMENTS

| | | |
|---|---|---|
| WO | 2018222209 | 12/2018 |
| WO | 2020005194 | 1/2020 |

OTHER PUBLICATIONS

J. Garcia et al., "Successful application of a new electromagnetic corrosion tool for well integrity evaluation in old wells completed with reduced diameter tubular," IPTC 16997, Mar. 2013.

Schlumberger, EM Pipe Scanner, Electromagnetic casing inspection tool, Dec. 8, 2009. Available at https://www.slb.com/-/media/files/fe/brochure/em-pipe-scanner-br.ashx, Accessed Apr. 6, 2021.

Gowell—MTD, Nov. 2018.

TGT - EMPulse, Arbuzov, et al., Multi String Imaging EM Pulse, Jun. 2016.

Spartek Systems, Casing Hole Logging, Casing Inspection Tool, Oct. 25, 2013.

Halliburton, Electromagnetic Pipe Xaminer® V Tool, Available at https://www.halliburton.com/en/products/electromagnetic-pipe-xaminer-v-tool, accessed Apr. 6, 2021.

S. M. Haugland, "Fundamental analysis of the remote-field eddy current effect", IEEE Transactions on Magnetics, vol. 32, No. 4, pp. 3195-3211, 1996.

J. Garcia et al., "Successful application of a new electromagnetic corrosion tool for well integrity evaluation in old wells completed with reduced diameter tubular," IPTC 16997.

Schlumberger EM Pipe Scanner.

Gowell—MTD.

Andrey Arbuzov, Maxim Volkov, Sami El Halfawi, Arthur Aslanyan, Multi String Imaging EM Pulse, TGT—EMPulse.

SparTek_Systems-Casing_Inspection_Tool.

Electromagnetic Pipe Xaminer® V Tool.

Great Britain Search and Examination Report for Application No. GB2110871.7 dated Apr. 5, 2022.

* cited by examiner

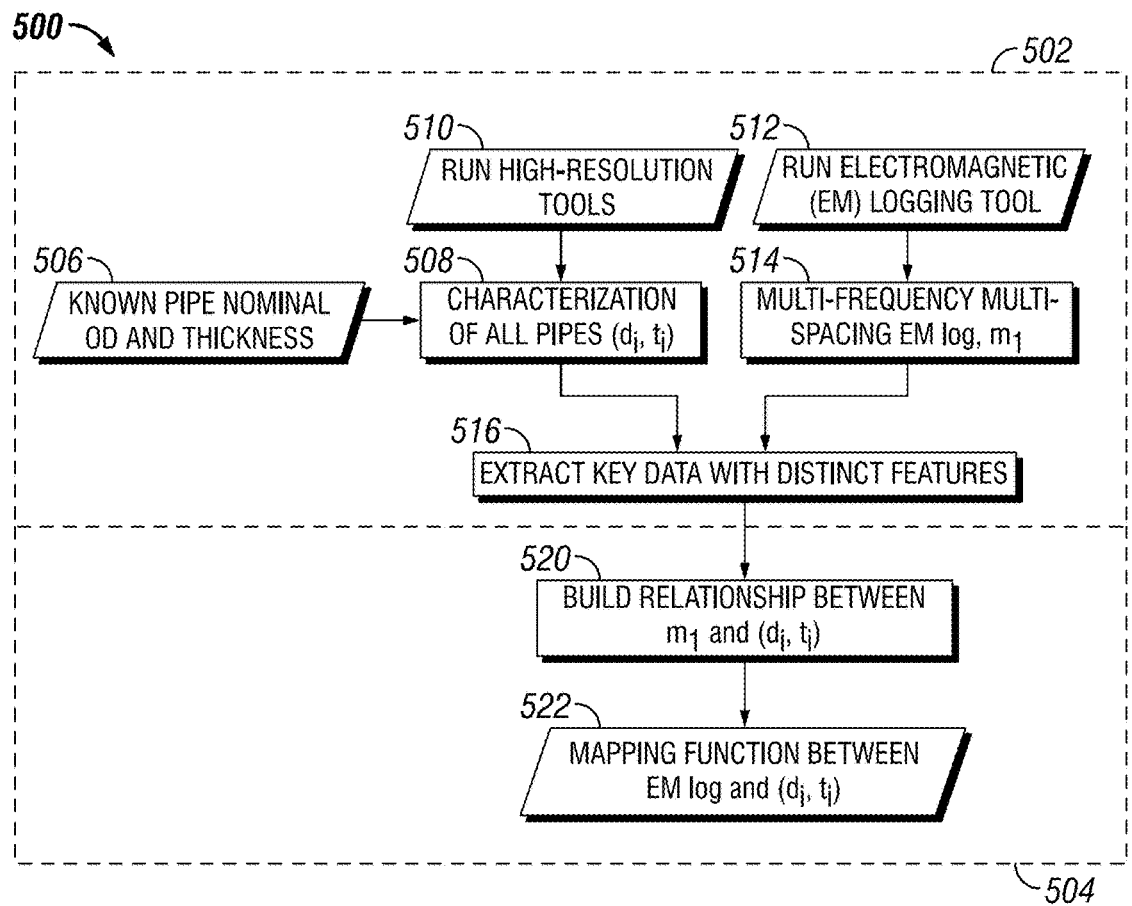
FIG. 5
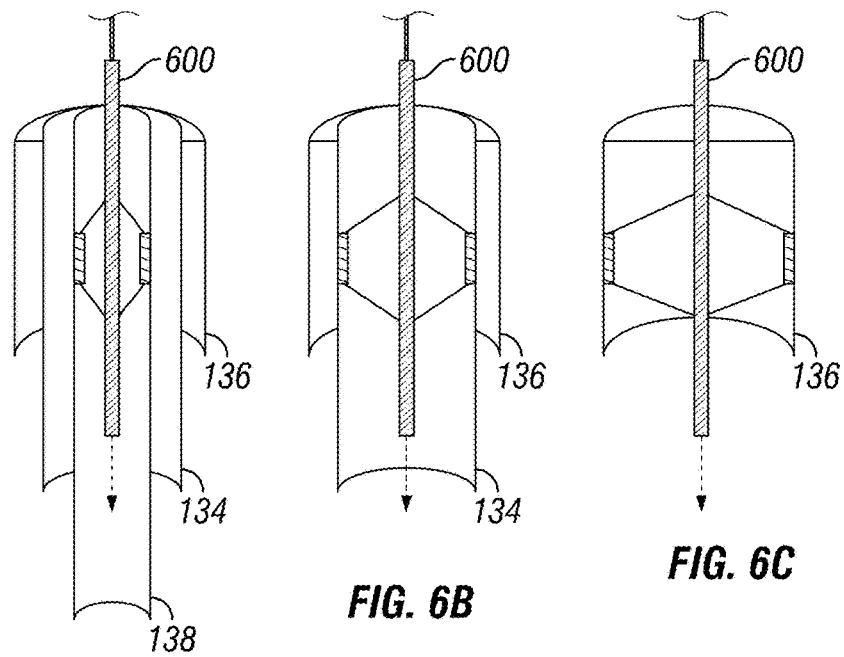
FIG. 6A
FIG. 6B
FIG. 6C

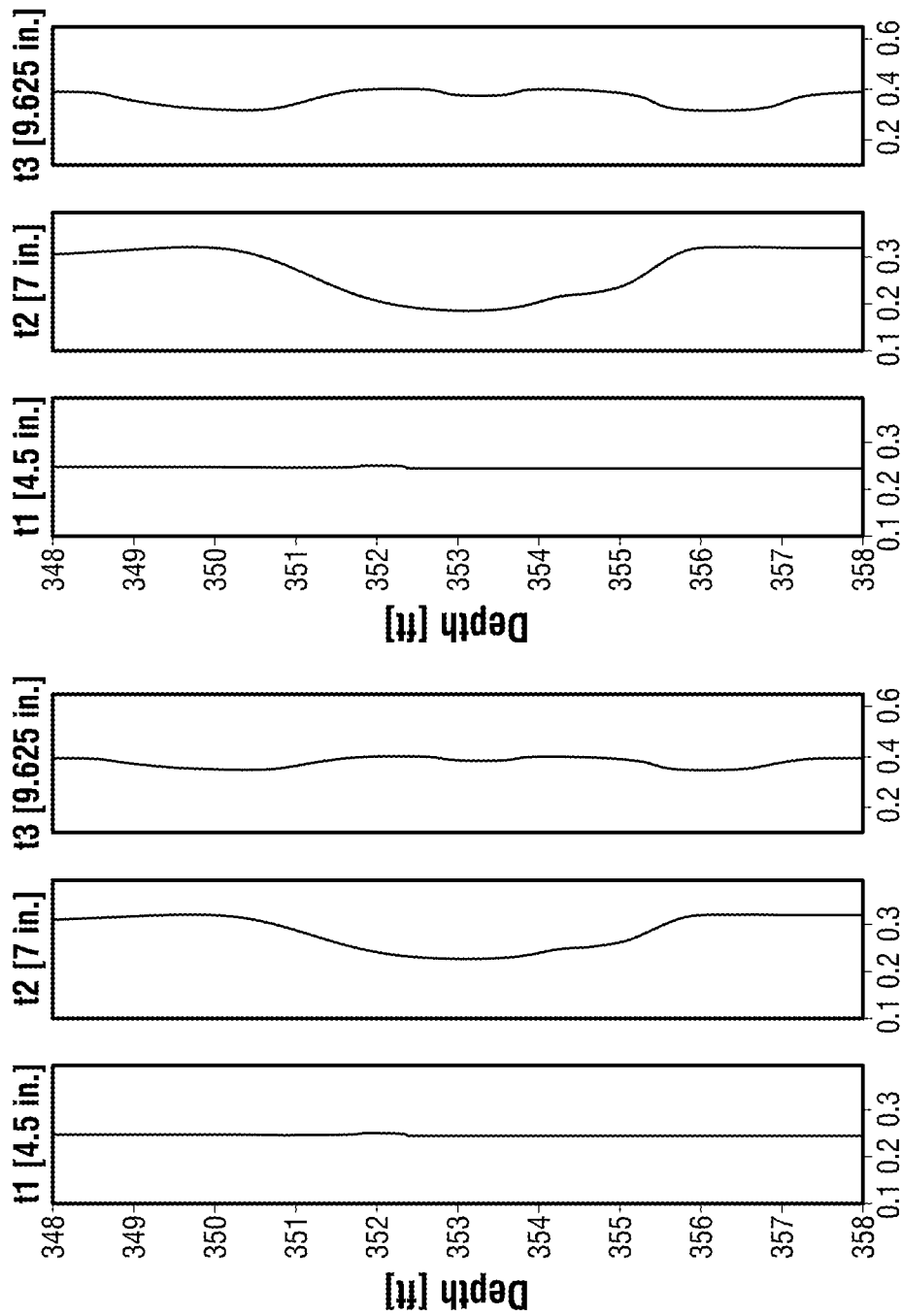

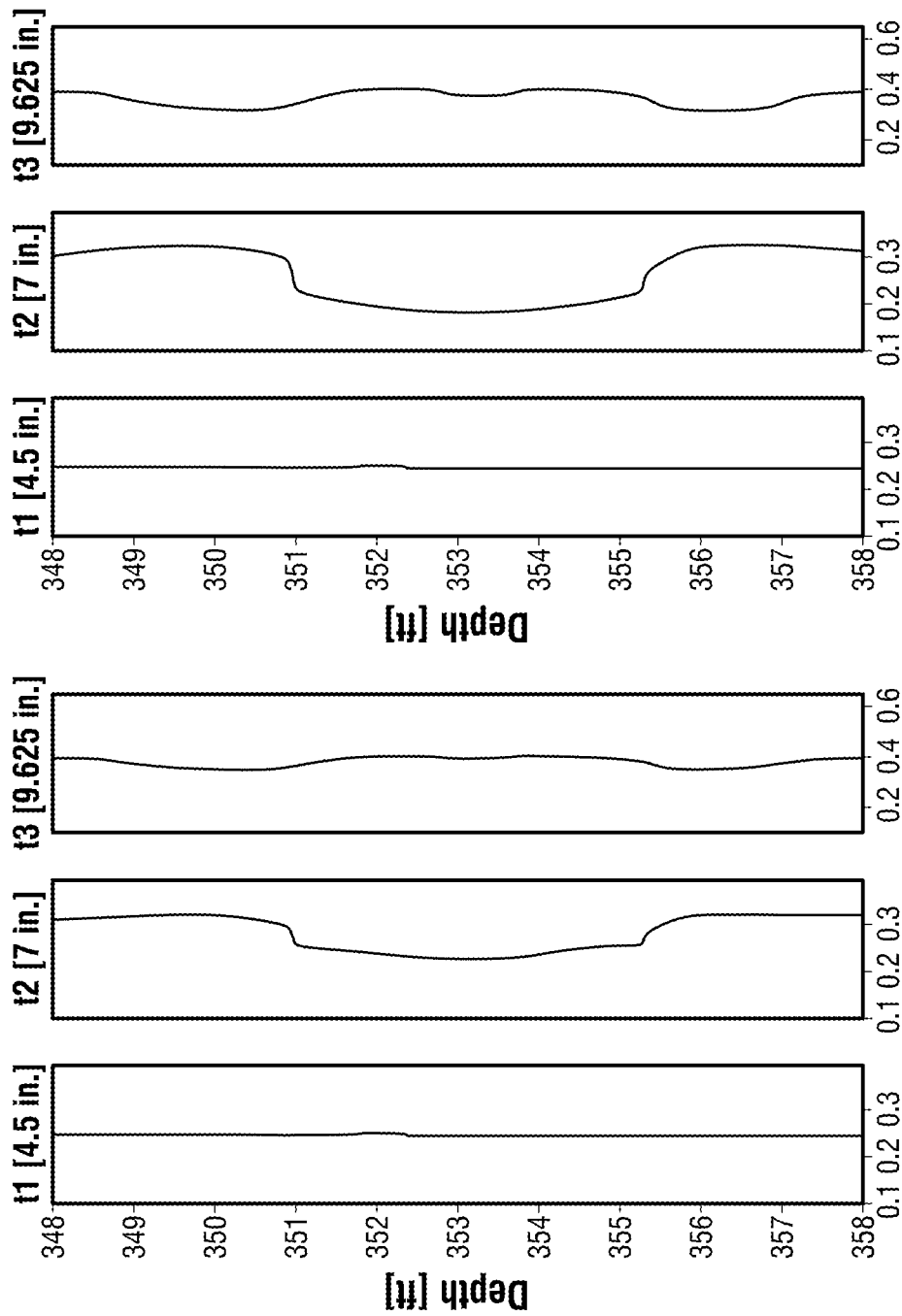

IDENTIFYING CORROSION FROM ELECTROMAGNETIC CORROSION MEASUREMENTS AND HIGH-RESOLUTION CIRCUMFERENTIAL MEASUREMENTS

BACKGROUND

For oil and gas exploration and production, a network of wells, installations and other conduits may be established by connecting sections of metal pipe together. For example, a well installation may be completed, in part, by lowering multiple sections of metal pipe (e.g., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate pipe thickness or other corrosion indicators.

Additionally, high-resolution corrosion tools may be used for corrosion detection. However, high-resolution corrosion tools operate by directly contacting the casing, which may produce high-resolution data and circumferential data. High-resolution corrosion tools may be magnetic flux leakage tools, acoustic tools, mechanical caliper, and others that typically analyze a single pipe. This forces the operator to pull pipe so that outer pipes may be inspected by the high-resolution corrosion tool, which brings risk and down time for the well.

Other technology, such as electromagnetic (EM) technology offers multiple string analysis. However, resolution is deteriorated and is not as informative as the data provided by high-resolution corrosion tools. Both technologies, high-resolution corrosion tools and EM corrosion tools have data and monetary considerations that make it difficult and expensive to perform corrosion monitoring operations.

BRIEF DESCRIPTION OF THE DRAWINGS

These drawings illustrate certain aspects of some examples of the present disclosure and should not be used to limit or define the disclosure.

FIG. 5 illustrates a workflow for forming a corrosion map;

FIGS. 6A-6C illustrate a high-resolution tool measurement operation;

FIGS. 11A and 11B illustrated inverted pipe thickness from the EM logs for the two sets of data from FIGS. 10A and 10B, respectively;

FIGS. 13A and 13B illustrate the extent of a corrosion area at time $t_1$ and $t_2$.

DETAILED DESCRIPTION

This disclosure may generally relate to pipe inspection in subterranean wells and, more particularly, to methods and systems for identifying artifacts, corrosion, and/or anomalies using an electromagnetic logging tool together with measurements from a high-resolution tool in an eccentric pipe configuration comprising a plurality of pipes. The use of high-resolution information along with setting corrosion patterns or geometric information, allows for the calibration and improved resolution of electromagnetic (EM) logging data. By combining high-resolution logging of corrosion data and using it with measurement of the EM logging tool, which has a lower resolution, an operator may create a detailed map of corrosion in multiple tubulars in a concentric multi-string arrangement during operation in which an EM logging tool is run.

Electromagnetic (EM) sensing may provide continuous in-situ measurements of parameters related to the integrity of pipes in cased boreholes. As a result, EM sensing may be used in cased borehole monitoring applications. EM logging tools may be configured for multiple concentric pipes (e.g., for one or more) with the first pipe diameter varying (e.g., from about two inches to about seven inches or more).

EM logging tools may measure eddy currents to determine metal loss and use magnetic cores with one or more coils to detect defects in multiple concentric pipes. The EM logging tools may use pulse eddy current (time-domain) and may employ multiple (long, short, and transversal) coils to evaluate multiple types of defects in multiple concentric pipes. It should be noted that the techniques utilized in time-domain may be utilized in frequency-domain measurements. In examples, EM logging tools may operate on a conveyance. Additionally, EM logging tools may include an independent power supply and may store the acquired data on memory.

Monitoring the condition of the production and intermediate casing strings is crucial in oil and gas field operations. EM eddy current (EC) techniques have been successfully used in inspection of these components. EM EC techniques include two broad categories: frequency-domain EC techniques and time-domain EC techniques. In both techniques, one or more transmitters are excited with an excitation signal, and the signals from the pipes are received and recorded for interpretation. The magnitude of a received signal is typically inversely proportional to the amount of metal that is present in the inspection location. For example, less signal magnitude is typically an indication of more metal, and more signal magnitude is an indication of less metal. This relationship may allow for measurements of metal loss, which typically is due to an anomaly related to the pipe such as corrosion or buckling.

Figure 1:
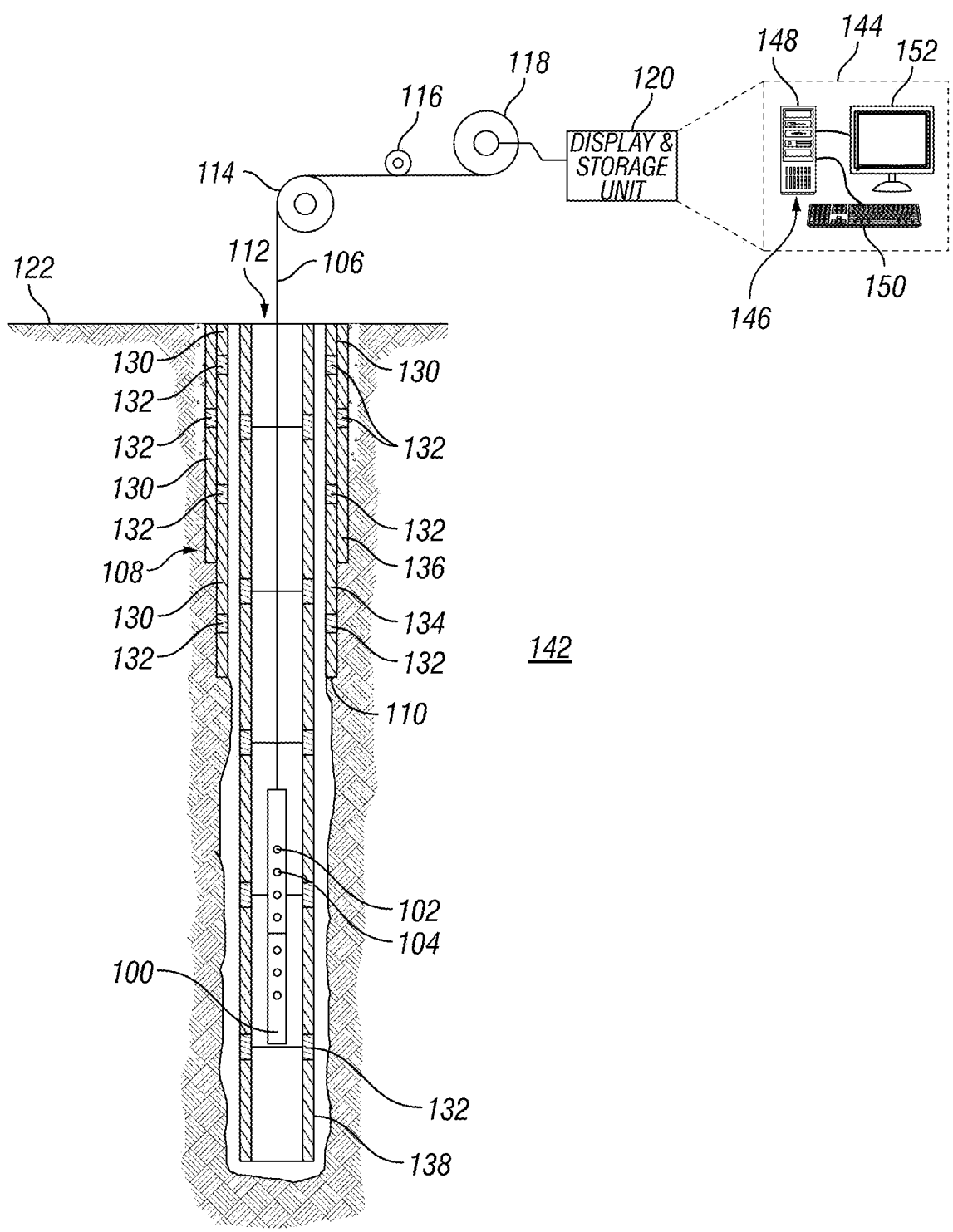
FIG. 1 illustrates an example of an EM logging tool disposed in a wellbore.

FIG. 1 illustrates an operating environment for an EM logging tool 100 as disclosed herein in accordance with some embodiments. EM logging tool 100 may comprise a transmitter 102 and/or a receiver 104. In examples, transmitters 102 and receivers 104 may be coil antennas. Furthermore, transmitter 102 and receiver 104 may be separated by a space between about 0.1 inches (0.254 cm) to about 200 inches (508 cm). In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104 or vice versa. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in wellbore 110.

Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. It should be noted that an operator may include an individual, group of individuals, or organization, such as a service company. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100 in casing string 108.

A typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. Such as, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110.

EM logging tool 100 may include a digital telemetry system which may further include one or more electrical circuits, not illustrated, to supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within EM logging tool 100 and data provided by EM logging tool 100 may be stored within EM logging tool 100, rather than transmitted to the surface to display and storage unit 120 during logging operations. The data may include signals and measurements related to corrosion detection.

During operations, transmitter 102 may broadcast electromagnetic fields into subterranean formation 142. It should be noted that broadcasting electromagnetic fields may also be referred to as transmitting electromagnetic fields. The electromagnetic fields transmitted from transmitter 102 may be referred to as a primary electromagnetic field. The primary electromagnetic fields may produce Eddy currents in casing string 108 and pipe string 138. These Eddy currents, in turn, produce secondary electromagnetic fields that may be sensed and/or measured by receivers 104. Characterization of casing string 108 and pipe string 138, including determination of pipe attributes, may be performed by measuring and processing primary and secondary electromagnetic fields. Pipe attributes may include, but are not limited to, pipe thickness, pipe conductivity, and/or pipe permeability.

As illustrated, receivers 104 may be positioned on EM logging tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may broadcast, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Broadcasting of EM fields by transmitter 102 and the sensing and/or measuring of secondary electromagnetic fields by receivers 104 may be controlled by display and storage unit 120, which may include an information handling system 144. As illustrated, the information handling system 144 may be a component of or be referred to as the display and storage unit 120, or vice-versa. Alternatively, the information handling system 144 may be a component of EM logging tool 100. An information handling system 144 may include any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price.

Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein, Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed and/or measured with the primary electromagnetic fields by receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be sensed and/or measured by receivers 104 placed at some distance on EM logging tool 100 from transmitter 102, as shown on FIG. 1. Alternatively, the secondary electromagnetic fields may be sensed and/or measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times for first casing 134, for second casing 136, and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. In examples, a remote-field eddy current (RFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}\,t \qquad (1)$$

and the magnitude of the impedance shows the dependence:

$$\exp\left[-2\sqrt{\frac{\omega\mu\sigma}{2}}\,t\right] \qquad (2)$$

where ω is the angular frequency of the excitation source, μ is the magnetic permeability of the pipe, σ is the electrical conductivity of the pipe, and t is the thickness of the pipe. By using the common definition of skin depth for the metals as:

$$\delta = \sqrt{\frac{2}{\omega\mu\sigma}} \qquad (3)$$

The phase of the impedance varies as:

$$\varphi \cong 2\frac{t}{\delta} \qquad (4)$$

and the magnitude of the impedance shows the dependence:

$$\exp\left[\frac{-2t}{\delta}\right] \quad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal which broadcast an electromagnetic field and receiver 104 may sense and/or measure the reflected excitation signal, a secondary electromagnetic field, for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Figure 2:
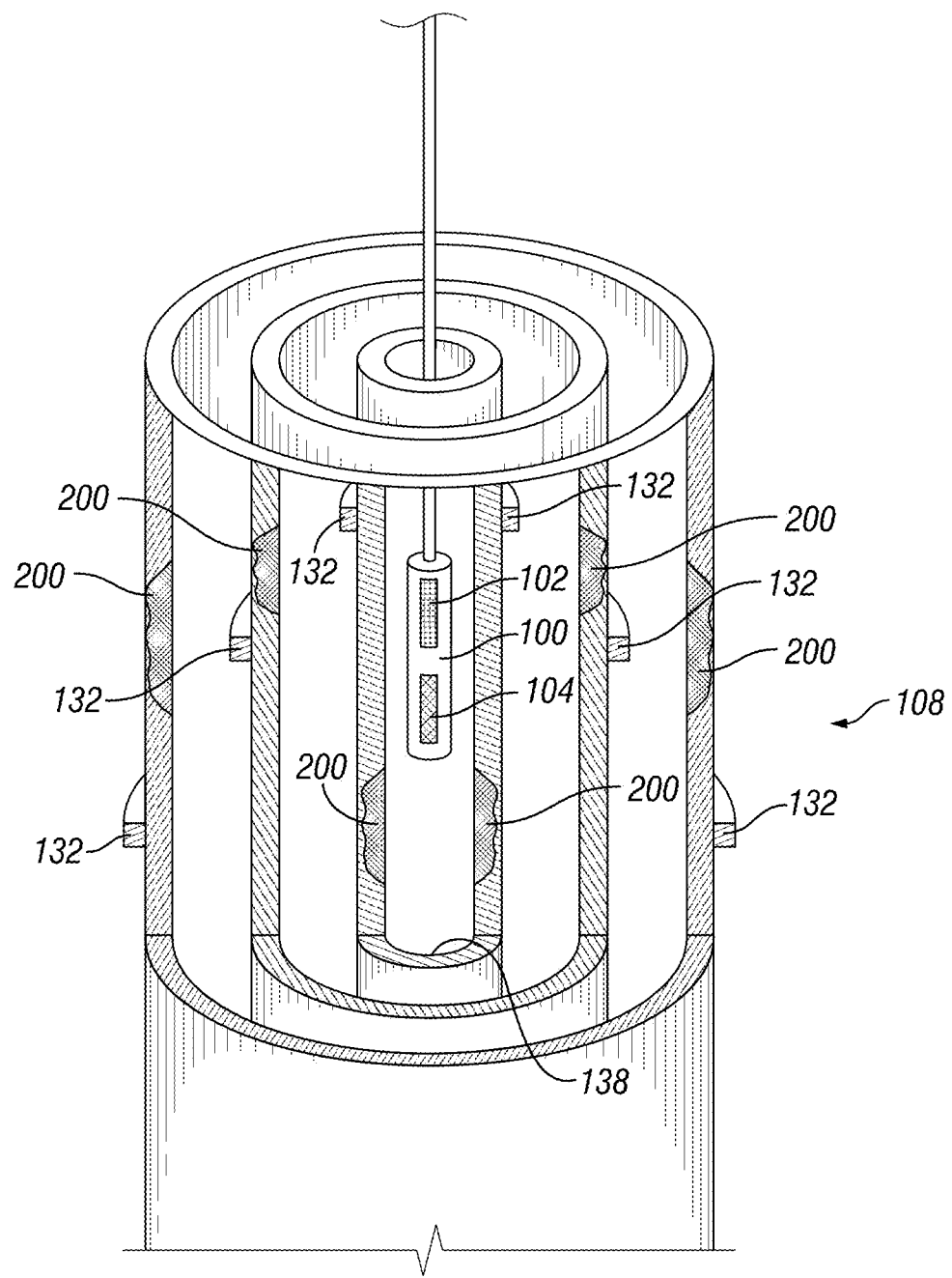
FIG. 2 illustrates an example of arbitrary defects within multiple pipes.
Figure 3A:
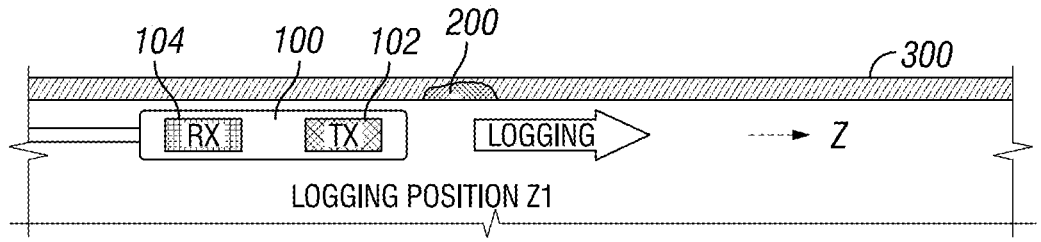
FIG. 3A illustrates an example of an EM logging tool traversing a wellbore.
Figure 3B:
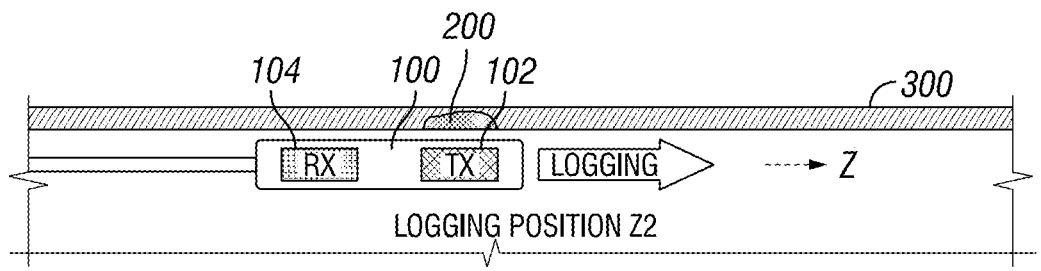
FIG. 3B illustrates another example of an EM logging tool traversing a wellbore.
Figure 3C:
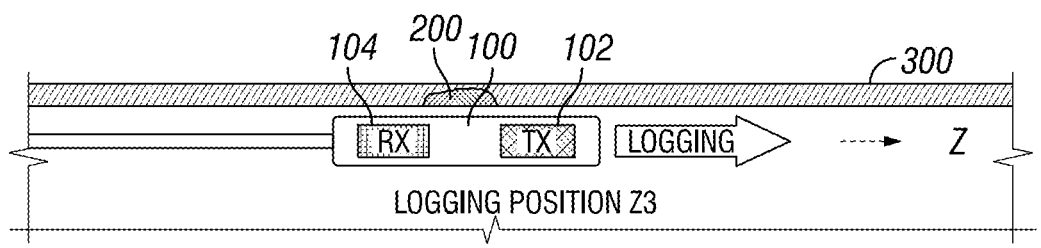
FIG. 3C illustrates another example of an EM logging tool traversing a wellbore.
Figure 3D:
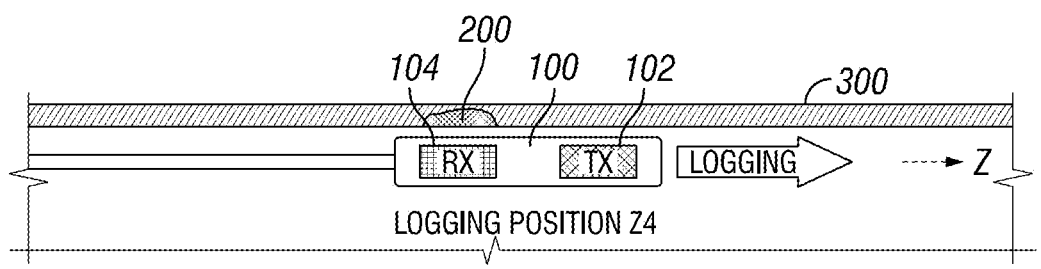
FIG. 3D illustrates another example of an EM logging tool traversing a wellbore.
Figure 3E:
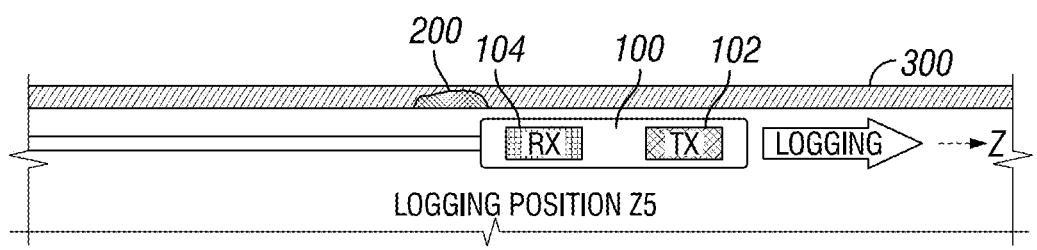
FIG. 3E illustrates another example of an EM logging tool traversing a wellbore.

FIG. 2 shows EM logging tool 100 disposed in pipe string 138 which may be surrounded by a plurality of nested pipes (e.g., first casing 134 and second casing 136) and an illustration of anomalies 200 disposed within the plurality of nested pipes, in accordance with some embodiments. As EM logging tool 100 moves across pipe string 138 and casing string 108, one or more transmitters 102 may be excited, and a signal (mutual impedance between 102 transmitter and receiver 104) at one or more receivers 104, may be recorded.

Due to eddy current physics and electromagnetic attenuation, pipe string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different pipes of a multiple nested pipe configuration, multiple transmitter-receiver spacing, and frequencies may be utilized. For example, short spaced transmitters 102 and receivers 104 may be sensitive to first casing 134, while longer spaced transmitters 102 and receivers 104 may be sensitive to second casing 136 and/or deeper (3rd, 4th, etc.) pipes. By analyzing the signal levels at these different channels with inversion methods, it is possible to relate a certain received signal to a certain metal loss or gain at each pipe. In addition to loss of metal, other pipe properties such as magnetic permeability and conductivity may also be estimated by inversion methods. It should be noted that inversion methods may include model-based inversion which may include forward modeling. However, there may be factors that complicate interpretation of losses. For example, deep pipe signals may be significantly lower than other signals. Double dip indications appear for long spaced transmitters 102 and receivers 104. Spatial spread of long spaced transmitter-receiver signals for a collar 132 may be long (up to 6 feet (1.8 meters)). Due to these complications, methods may need to be used to accurately inspect pipe features.

FIGS. 3A-3E illustrates an electromagnetic inspection and detection of anomalies 200 (e.g., defects) or collars 132 (e.g., Referring to FIG. 2), in accordance with some embodiments. As illustrated, EM logging tool 100 may be disposed in pipe string 138, by a conveyance, which may comprise any number of concentric pipes. As EM logging tool 100 traverses across pipe 300, one or more transmitters 102 may be excited, and a signal (mutual impedance between transmitter 102 and receiver 104) at one or more receivers 104, may be recorded. Due to eddy currents and electromagnetic attenuation, pipe 300 may generate an electrical signal that is in the opposite polarity to the incident signal and results in a reduction in a received signal. Thus, more metal volume translates to greater signal lost. As a result, by inspecting the signal gains, it may be possible to identify zones with metal loss (such as corrosion). Similarly, by inspecting the signal loss, it may be possible to identify metal gain such as due to presence of a casing collar 132 (e.g., Referring to FIG. 1) where two pipes meet with a threaded connection. In order to distinguish signals from different pipes in a multiple concentric pipe configuration, multiple transmitter-receiver spacing, and frequencies may be used. For example, short spaced transmitters 102 and receivers 104 may be sensitive to pipe string 138, while long spaced transmitters 102 and receivers 104 may be sensitive to deeper pipes (e.g., first casing 124, second casing 136, etc.). By analyzing the signal levels at these different channels through a process of inversion, it may be possible to relate a certain received signal set to a certain set of metal loss or gain at each pipe. In examples, there may be factors that complicate the interpretation and/or identification of collars 132 and/or anomalies 200 (e.g., defects).

For example, due to eddy current physics and electromagnetic attenuation, pipes disposed in pipe string 138 (e.g., referring to FIG. 1 and FIG. 2) may generate an electrical signal that may be in the opposite polarity to the incident signal and results in a reduction in the received signal. Generally, as metal volume increases the signal loss may increase. As a result, by inspecting the signal gains, it may be possible to identify zones with metal loss (such as corrosion). In order to distinguish signals that originate from anomalies 200 (e.g., defects) at different pipes of a multiple nested pipe configuration, multiple transmitter-receiver spacing, and frequencies may be used. For example, short spaced transmitters 102 and receivers 104 may be sensitive to first pipe string 138 (e.g., referring to FIG. 2), while long spaced transmitters 102 and receivers 104 may be sensitive to deeper ($2^{nd}$, $3^{rd}$, etc.) pipes (e.g., first casing 134 and second casing 136).

Analyzing the signal levels at different channels with an inversion scheme, it may be possible to relate a certain received signal to a certain metal loss or gain at each pipe. In addition to loss of metal, other pipe properties such as magnetic permeability and electrical conductivity may also be estimated by inversion. There may be several factors that complicate interpretation of losses: (1) deep pipe signals may be significantly lower than other signals; (2) double dip indications appear for long spaced transmitters 102 and receivers 104; (3) spatial spread of long spaced transmitter-receiver signal for a collar 132 may be long (up to 6 feet); (4) to accurately estimate of individual pipe thickness, the material properties of the pipes (such as magnetic permeability and electrical conductivity) may need to be known with fair accuracy; (5) inversion may be a non-unique process, which means that multiple solutions to the same problem may be obtained and a solution which may be most physically reasonable may be chosen. Due to these complications, an advanced algorithm or workflow may be used to accurately inspect pipe features, for example when more than two pipes may be present in pipe string 138.

During logging operations as EM logging tool 100 traverses across pipe 300 (e.g., referring to FIG. 3), an EM log of the received signals may be produced and analyzed. The EM log may be calibrated prior to running inversion to account for the deviations between measurement and simulation (forward model). The deviations may arise from several factors, including the nonlinear behavior of the magnetic core, magnetization of pipes, mandrel effect, and inaccurate well plans. Multiplicative coefficients and constant factors may be applied, either together or individually, to the measured EM log for this calibration.

Figure 4:
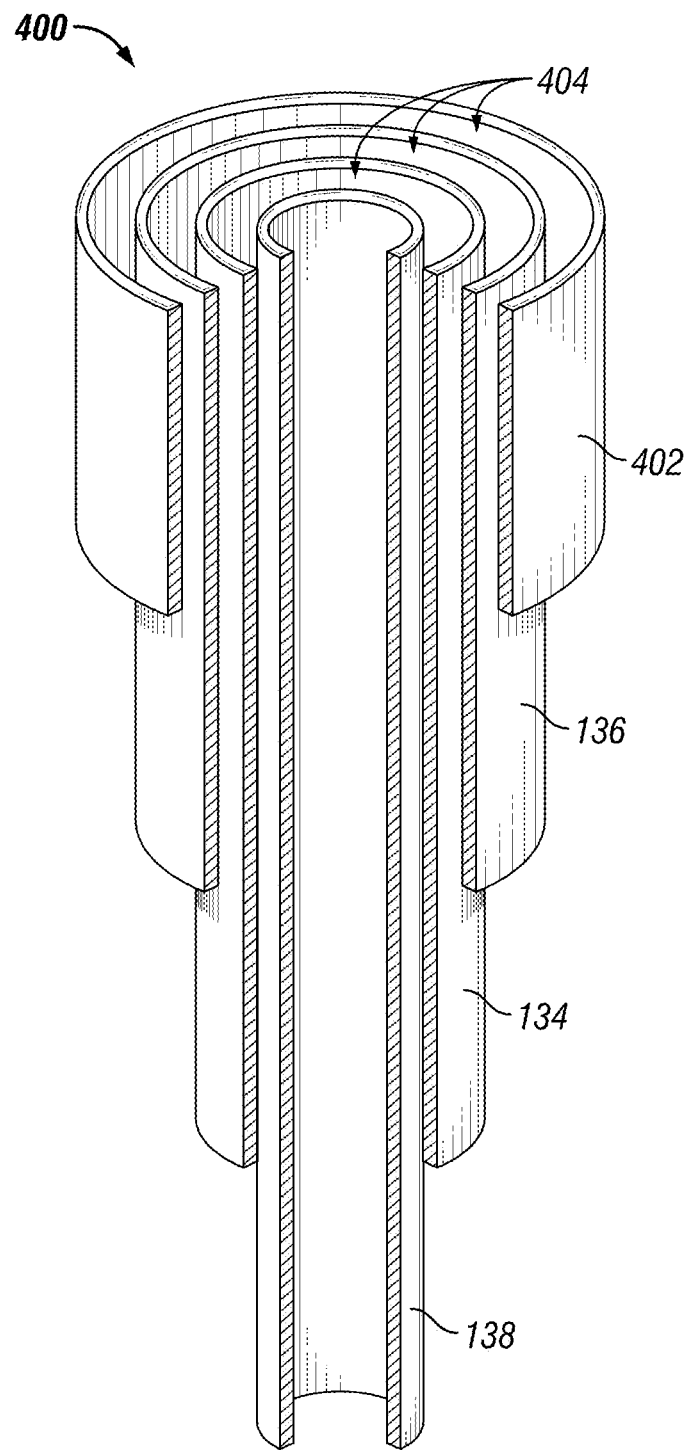
FIG. 4 illustrates an example of a well plan.

FIG. 4 illustrates an example of a well plan 400 in accordance with some embodiments. Depending on the design of well plan 400, well construction may have between two and four main components. These components include conductor, surface, intermediate and production casings. After completion of the well, a tubing may be inserted to pump hydrocarbon products. In this example, well plan 400 may comprise pipe string 138, first casing 134, second casing 136, a conductor casing 402, and wherein cement may be disposed in annulus 404 between each casing. However, it should be noted that well plan 400 may include any number of pipes, casings, tubulars, and/or the like. Well plan 400 is not limited or bound by the four pipes that are displayed in FIG. 4. When EM logging tool 100 is used to monitor the pipe condition a log may be produced.

Monitoring the condition of the casing strings is crucial in oil and gas field operations. As discussed above, EM techniques may be used to inspect pipes, casings, tubulars, and/or the like. To acquire stronger response from the outer pipes of a nested tubulars, typically, a larger transmitter coil is employed together with larger receiver coils that are placed at large distances away from the transmitter with low frequency excitation. However, such measurements degrade the vertical (along the depth) resolution in the thickness estimation results, and since omnidirectional coils are used, measurements made by such tools lack any directional sensitivity. On the other hand, there are some corrosion tools used on casing inspection which have a very high-resolution and circumferential information. These high-resolution tools may be flux leakage tools, ultrasonic tools, mechanical caliper, and others that typically analyze one immediate pipe only at each logging.

Disclosed below are methods for combining an electromagnetic log from EM logging tool 100 and measurements of a high-resolution tool (not illustrated) to provide a map of possible corrosion within pipes, casings, tubulars, and/or the like. A map of corrosion may be created through a mapping process to relate an EM log, formed using an EM logging tool 100, with high-resolution measurements. High-resolution measurements are defined as measurements with directional sensitivity of a few degrees or less circumferentially, less than one foot (0.3 meter) from a receiver 104 (e.g., referring to FIG. 1), and along the axis of EM logging tool 100.

FIG. 5 illustrates a workflow 500 for identifying corrosion on one or more tubulars in wellbore 110 (e.g., referring to FIG. 1). As illustrated in FIG. 5, identifying corrosion may be divided into two distinct operations, a database operation 502 and a comparison operation 504. Utilizing both database operation 502 and comparison operation 504 allows for the identification of corrosion in tubulars in well plan 400 (e.g., referring to FIG. 4). Forming a database in operation 502 may begin with block 506. In block 506, known individual pipe nominal outer diameter and thickness may be ascertained form manufacturing specification. This information may also come from previous well correction logs, measurements, and recordings from previous well plans. Well plans may include information, such as nominal outer diameter and thickness, on pipe string 138, first casing 134, second casing 136, a conductor casing 402, and wherein cement may be disposed in annulus 404 between each casing (e.g., referring to FIG. 4).

The information from block 506 may be feed into block 508. In block 508 characterization of all tubulars within a specified wellbore may be performed. Characterization of all tubulars in block 508 may also require high-resolution measurements of each tubular with a high-resolution tool. In block 510, a high-resolution tool (discussed further below) may be run into pipe string 138, first casing 134, second casing 136, or a conductor casing 402.

FIGS. 6A-6C illustrates a method for high-resolution tool 600 to measure each tubular. As illustrated, a high-resolution log is created for each tubular in which high-resolution tool 600 comes into contact. A high-resolution log is created for vertical directions that are 1 foot (0.3 meter) or less. The high-resolution log includes azimuthal information at each depth of measurement. Thus, the high-resolution log includes different angle measurements that identify different thickness values in each tubular. For better resolution, high-resolution tool 600 may be in immediate contact with a tubular, hence the inner tubular needs to be pull out after running a measurement on the inner tubular to measure the next outer tubular. For example, in FIG. 6A, high-resolution tool 600 is in contact with pipe string 138, in which a high-resolution log is formed from measurements taken of pipe string 138. In FIG. 6B, pipe string 138 is removed and high-resolution tool 600 performs a high-resolution measurement on first casing 134 to create a high-resolution log of first casing 134. In FIG. 6C, the process is repeated, first casing 134 is removed and high-resolution tool 600 performs a high-resolution measurement on second casing 136 to create a high-resolution log of second casing 136. If certain pipe is unreachable, the nominal pipe information from block 506 (e.g., referring to FIG. 5) may be used.

High-resolution tool 600 may characterize all pipe information including inner diameter and thickness. As discussed above, high-resolution tool 600 may only measure the first pipe that is immediate to the high-resolution tool 600. Hence, in order to measure outer pipes in the presence of inner pipe, the inner pipes need to be pulled out of wellbore 110 (e.g., referring to FIG. 1). However, the information from block 506 (e.g., referring to FIG. 5) may be used if certain tubulars cannot be measured or analyzed by high-resolution tools 600. Thus, each tubular may have its own profile stored in a database with all measurements taken from the high-resolution tool 600 in block 510 (e.g., referring to FIG. 5).

Referring back to FIG. 5, in block 512, EM logging tool 100 (e.g., referring to FIG. 1) is run in wellbore 110 (e.g., referring to FIG. 1). During this operation, EM logging tool 100 is run without removing any casing or tubing to obtain multi-frequency and multi-spacing logs. As discussed above, EM logging tool 100, may include one or more electromagnetic transmitters 102 (e.g., referring to FIG. 1) and one or more electromagnetic receiver 104 (e.g., referring to FIG. 1). This may allow EM logging tool 100 to acquire measurements in frequency or time domains. As discussed above, eddy current techniques allow for multiple pipe characterizations during a single operation.

In block 514, multifrequency and multi-spacing settings are created to form an EM log. For example, different depths of penetration and vertical resolutions are achieved via one transmitter 102 (e.g., referring to FIG. 1) and several receivers 104 (e.g., referring to FIG. 1) placed at various distances from transmitter 102. In examples, receivers 104 may be placed at a shorter distance from transmitter 102, which may allow EM logging tool 100 to measure responses from inner pipes with improved vertical resolution. Improved vertical resolution may increase within 1 foot (0.3 meter) of receivers 104. Additionally, azimuthal resolution may be improved in at any angle from receivers 104. This vertical resolution increase within 1 foot (0.3 meter) is not found in current technology. Receivers 104 that may be placed at longer distances form transmitter 102 may measure responses of all pipes but have a degradation of vertical resolution. Thus, an electromagnetic log formed from a logging operation may be processed to invert all casing information with one run. The information from blocks 508 and 514 may be further processed in block 516.

In block 516 key data points that include distinct features are extracted from the information provided in blocks 508 and 514. Distinct features are defined as one or more pipe properties. For example, different pipe properties may be specific to individual pipes in well pan 400 (e.g., referring to FIG. 4). This may be seen in that different pipes may induce different electromagnetic responses. Hence, once the electromagnetic response is given, the pipe information may be inferred by inversion techniques based on optimization. However, results are usually skewed, as the measurements may be averaged or omnidirectional data. To boost the resolution of EM logging tool 100 (e.g., referring to FIG. 1), the high-resolution log, from block 508, may be integrated with data from block 514 that may include a wide range of pipe thickness information to achieve accurate pipe information prediction. The data from block 514 includes known pipe information and corresponding electromagnetic response. Thus, data points may be extracted which have different features (like different thickness due to manufacturing tolerance, defect, collar, perforation, and pipe number changes) and stored in a database. Stored data points, for example, as shown in FIG. 2, may include location of a collar 132. A collar 132 is a threaded coupling used to join two lengths of pipe, which may increase the pipe thickness where collar 132 is located. Anomalies 200 (e.g., referring to FIG. 2), may be a data point which refers to as a penetration, may be a section of corroded or perforated pipe, which is thinner than standard tubulars. Other data points may be found from calculations. For example, in calculations if the number of tubulars change during measurements it may be regarded as complete metal loss. Other data points may be information such as universally agreed upon standards. For example, the American Petroleum Institute (API) allows for a 12% thickness variation between joints. Utilizing this database formed from block 510 and 508 and the EM log formed from block 512 and 514, a correlation between the EM log and the database may be found and identified. To form the correlation, or relationship, key data and distinct features are identified between the database and EM log, which is discussed above for block 516.

Once the database is constructed in operation 502, comparison operations 504 may be performed. Comparison operations 504 may begin with performing a logging operation in block 520. In block 520 a relationship may be established to relate tubular information ($m_1$) from the well log ($d_i$, $t_i$) created in block 512 in database operation 502. The relationship is found by defining the geometric shape or size of the defect and translating the omnidirectional measurement from the well log into metal loss for the corrosion area instead of an omnidirectional metal loss approach. This relationship may allow for corrosion mapping. In examples, methods may be employed to construct a mapping function for block 522. For examples, the mapping function for omnidirectional measurements may operate by taking the average metal loss that is measured, by having a definition of the metal loss area involved, the metal loss may be transposed from a broader average estimate to a representative metal loss for the defined area. In embodiments, the relationship and an EM log may be utilized to obtain high-resolution metal loss profile. This is possible because the metal loss is averaged, and the final output will loss directionality. Additionally, the raw metal loss from the high-resolution log includes directionality of metal loss in the input data. Then the output will still have directionality when utilized with the EM log.

Figure 7:
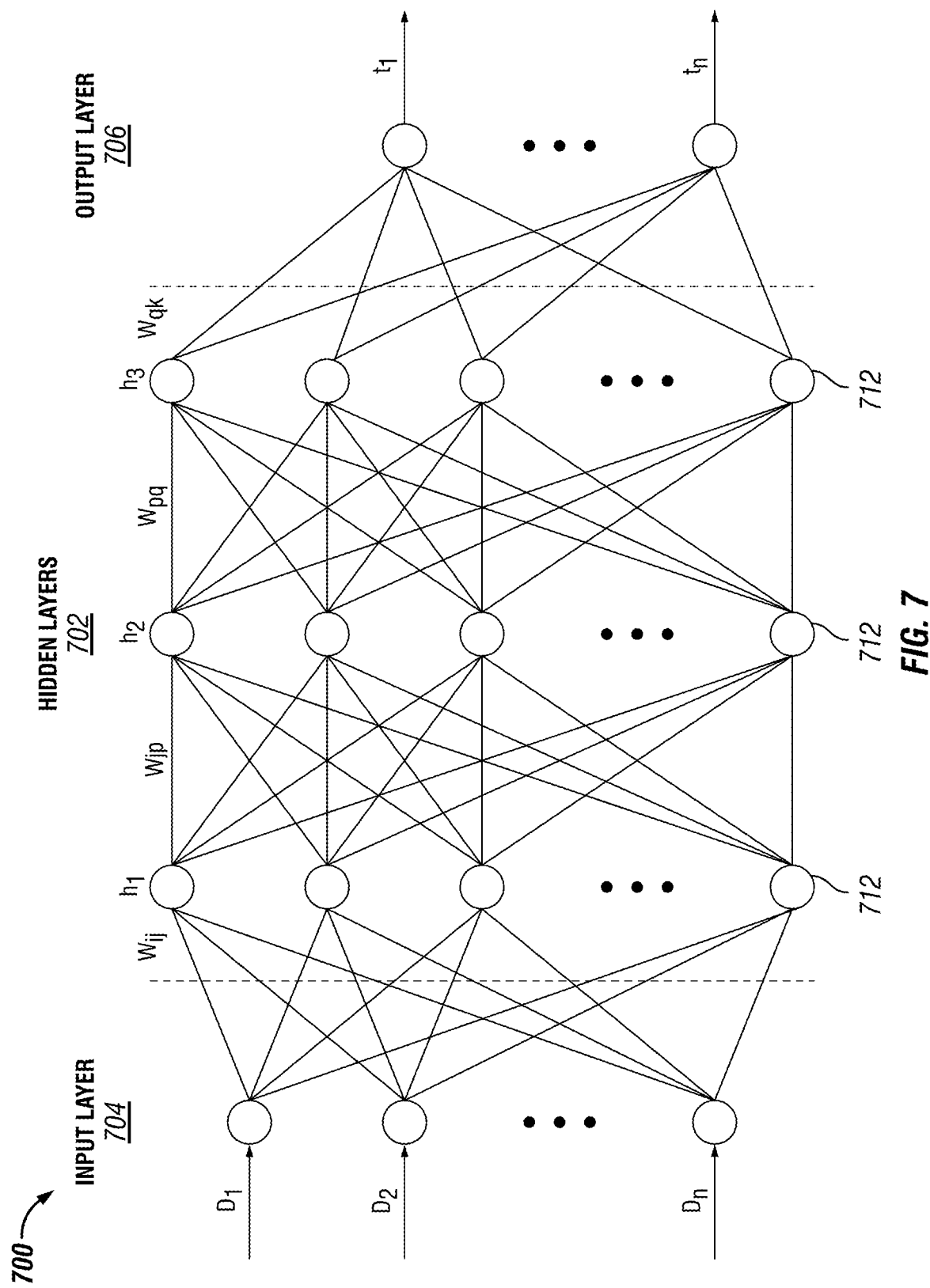
FIG. 7 illustrates a deep neural network.

In examples to determine a relationship, a deep neural network (DNN) 700, as illustrated in FIG. 7, may be utilized to connect the pipe information with high-resolution log data and EM log data. A DNN 700 is an artificial neural network with one or more hidden layers 702 between input layer 704 and output layer 706. As illustrated, input layer 704 may include all extracted electromagnetic responses from EM logging tool 100 (e.g., referring to FIG. 1), and output layers 706 may include pipe information from other sources, such as operation 502. During operations, input data is taken by neurons 712 in first layer which then provide an output to the neurons 712 within next layer and so on which provides a final output in output layer 706. Each layer may have one or more neurons 712. The connection between two neurons 712 of successive layers may have an associated weight. The weight defines the influence of the input to the output for the next neuron 712 and eventually for the overall final output. The training process of DNN is to find the suitable weights that aid into correct prediction of tubular thickness.

Once the relationship between electromagnetic responses and high-resolution pipe information is established by DNN 700, the prediction of pipe thickness with high-resolution is achievable in any future time when the only electromagnetic measurement is taken to further investigate pipe condition. In block 516, the mapping function established in block 614 may be utilized by DNN 700 with EM logs to determine thickness, and thus corrosion, or tubulars with high-resolution. This may allow for corrosion operations in which EM logging tool 100 may be run in a short time lapses (e.g., 1-2 years) and high-resolution tools 600 (e.g., referring to FIG. 6) may be run in longer time lapses (e.g., 3-4 years). Because running a high-resolution tool 600 usually requires the removal of tubulars, as discussed above, the cost of the operation increases along with the risk of damage to wellbore 110 (e.g., referring to FIG. 1) Running high-resolution tools 600 in longer time lapses may save cost and provide high-resolution pipe information. However, utilizing the methods described above, electromagnetic measurements taken by EM logging tool 100 may be able to predict tubular information, such as thickness, with enhanced resolution. When the high-resolution tool 600 is run to perform a thorough examination and the data may be added to the database established in database operations 502 (e.g., referring to FIG. 5) to refine the mapping function for better predication in the future. The application of the regular inspections may give a time-lapse profile of thickness variation for each tubular. It may provide information of areas vulnerable to defects and the tubulars may be replaced or treated before any major problem occur in wellbore 110.

Figure 8A:
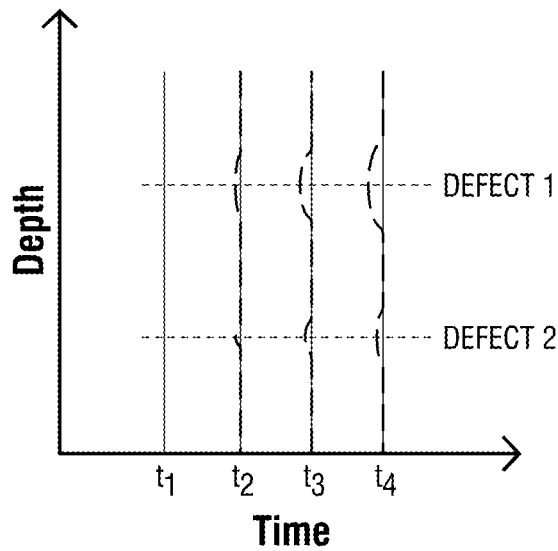
FIGS. 8A and 8B illustrate a simple plot of how the thickness varies over time.
Figure 8B:
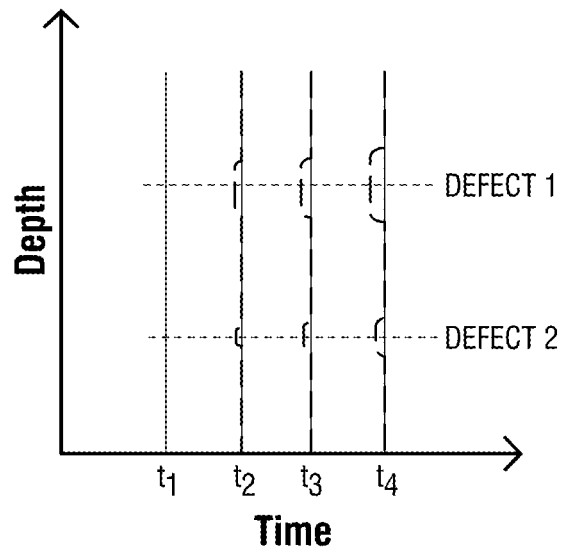

FIGS. 8A and 8B illustrate a simple plot of how the thickness variation over time may provide information of susceptible areas in a wellbore 110 (e.g., referring to FIG. 1). FIG. 8A illustrates electromagnetic measurements from EM logging tool 100 (e.g., referring to FIG. 1) that forms a well log during a corrosion measurement operation over four distinct time periods. As illustrated in FIG. 8A, anomalies 200 (defect 1 and defect 2) may be detected based on the amount of corrosion each anomaly 200 may contain. However, the shape of each anomaly 200 may be hard to identify in only EM measurements. FIG. 8B utilizes workflow 500 (e.g., referring to FIG. 5), describe above, to combine an electromagnetic log and a high-resolution log in a database to improve the resolution of a well log. Workflow 500 sharpens the edges of defects 1 and 2. This is further illustrated in small defect 2, where detection of small defect 2 at an early stage of the tubular's life may prevent aggravation. This kind of information is critical for the decision of when to apply a treatment to the tubulars or replace them.

Figure 9:
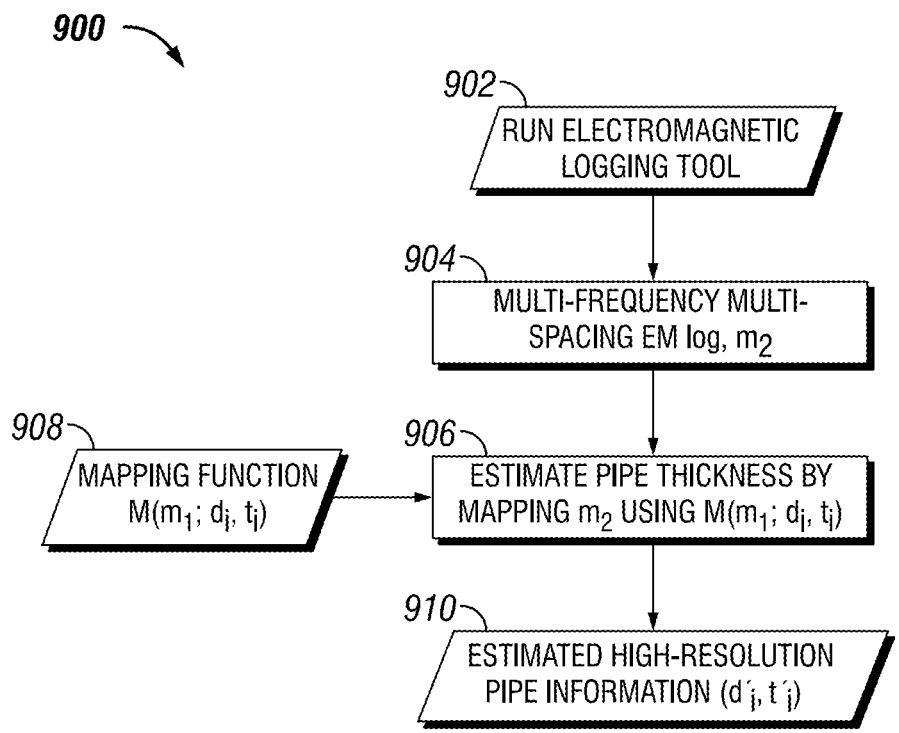
FIG. 9 illustrates workflow for predicting corrosion in a tubular.

Once a mapping function has been established, workflow 900 may be implemented as seen in FIG. 9 to predict corrosion in a tubular. Workflow 900 begins with block 902. In block 902, EM logging tool 100 (e.g., referring to FIG. 1) is run in wellbore 110 (e.g., referring to FIG. 1), and mirrors the operations in block 512 (e.g., referring to FIG. 5), discussed above. From block 902, the information is used in block 904 to form a multi-frequency and multi-spacing EM log, which mirrors the operations discussed above in block 514 (e.g., referring to FIG. 5). The information in block 904 is fed to block 906. Additionally, a mapping function M (m$_1$; d$_i$, t$_i$) from block 908 is an input into block 906.

In block 906, the EM log from block 904 and the mapping function from block 908 are utilized to estimate pipe thickness by mapping m$_2$ using M (m$_1$; d$_i$, t$_i$). This mapping function from block 908 originations from workflow 500 (e.g., referring to FIG. 5), specifically mirroring the operations in block 520 (e.g., referring to FIG. 5). After estimating pipe thickness by mapping in block 906, a high-resolution pipe information is estimated in block 910. High-resolution pipe information may take the form of a high-resolution image or information. The prediction in block 910 may be summarized that the high-resolution characterization of all pipes is characterized as t$_1$=(d$_i$, ti)$_1$ and the EM measurements are characterized as t$_1$=m$_1$ and t$_2$=m$_2$. This may allow for the prediction of a high-resolution thickness of the tubulars to be characterized as t$_2$=(d$_i$, ti)$_2$.

Figure 10A:
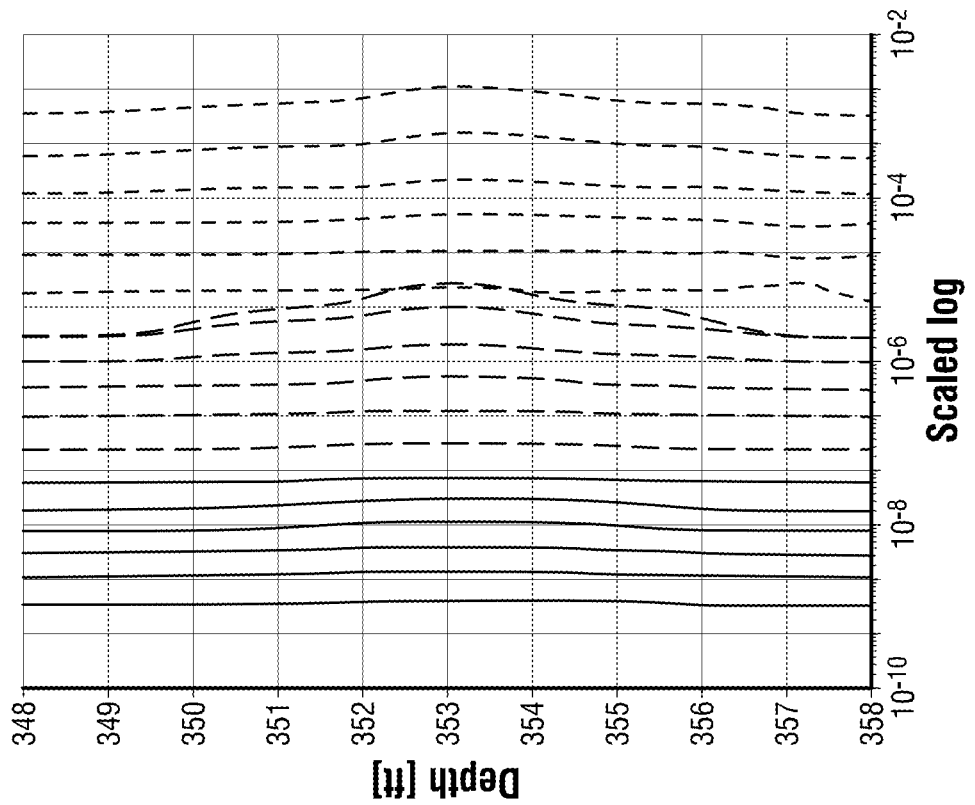
FIGS. 10A and 10B are measurements at time $t_1$ and $t_2$, respectively.
Figure 10B:
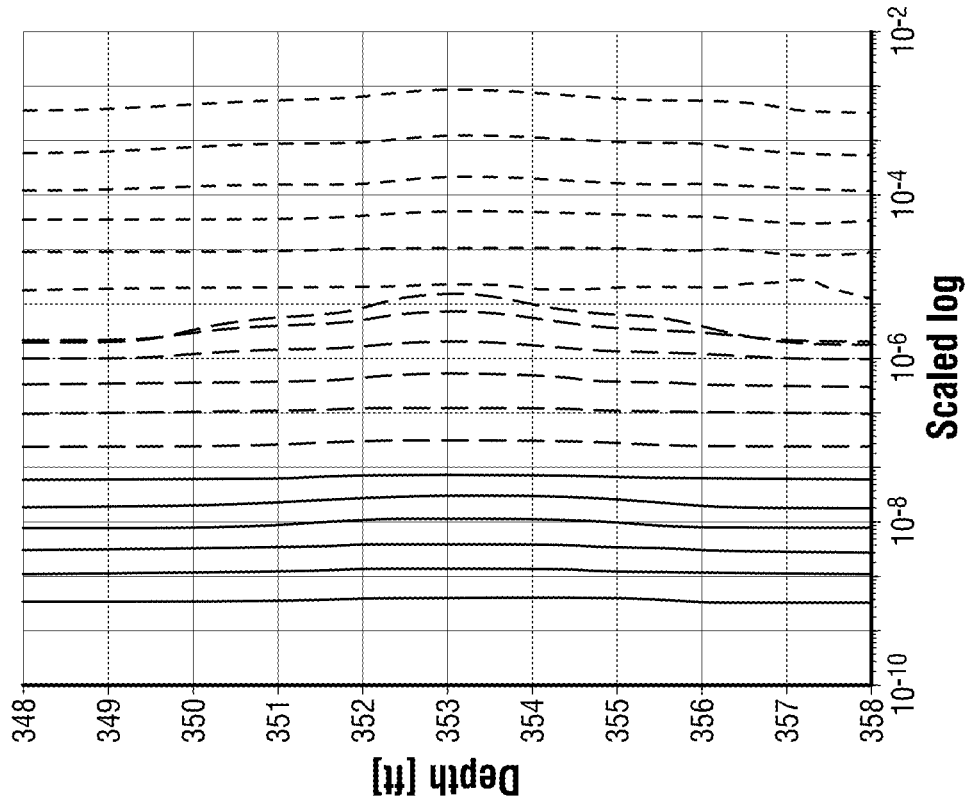
Figure 12A:
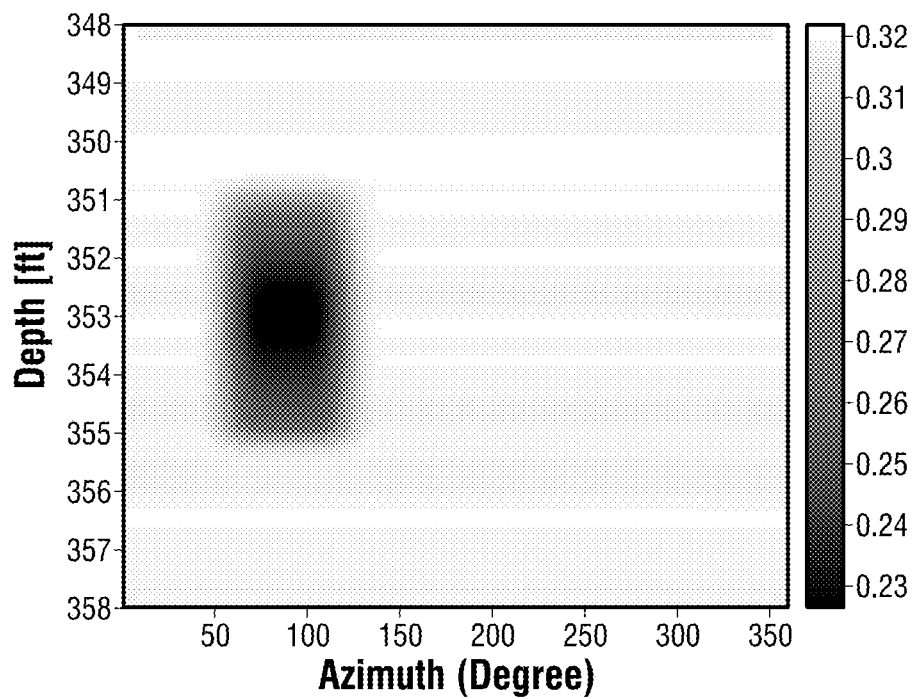
FIGS. 12A and 12B are resolution-enhanced inverted pipe thickness from the EM logs of FIGS. 10A and 10B.
Figure 12B:
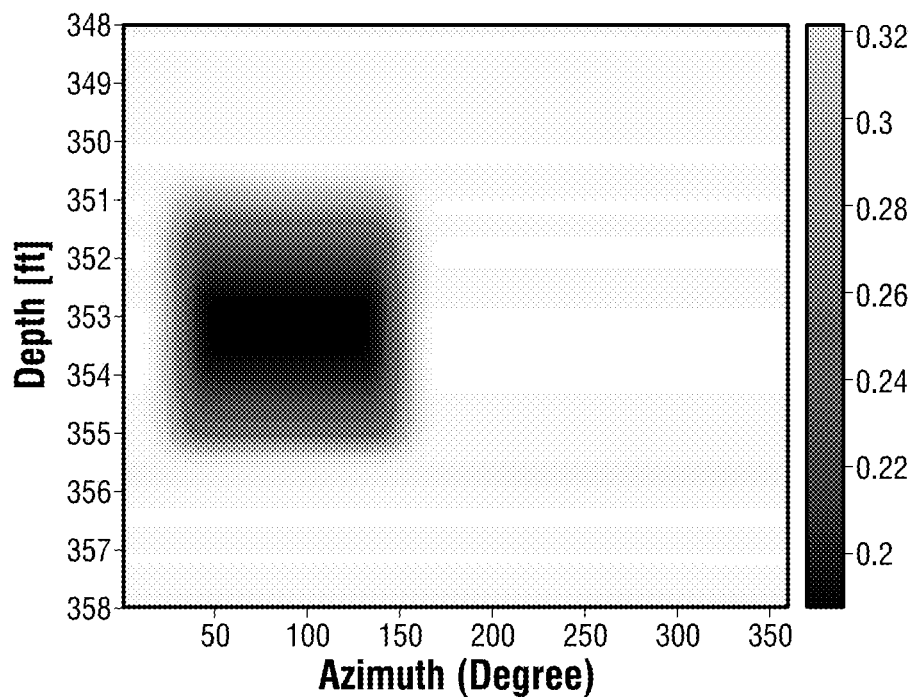

Below is an example of how workflows 500 and 900 may be used to improve the results from electromagnetic measurements and high-resolution log. In this example there are three tubulars, whose outer diameters are 4.5, 7, and 9.625 inches. Their tubular thicknesses are 0.25, 0.317, and 0.395 inches. There is a 4.3 ft long defect on the second tubular. When the EM log taken at time t$_1$, as shown in FIG. 10A, the thickness of tubular at the defected area was 0.226 inches (29% metal loss) with a 60-degree azimuthal angle. When the EM log taken at time t$_2$, as shown in FIG. 10B, the thickness of pipe at the defected area was 0.189 inches (40% metal loss) with a 120-degree azimuthal angle. FIGS. 11A and 11B show the inverted pipe thickness from the EM logs only for these two sets of data from FIGS. 10A and 10B, respectively. Due to the limit of the tool vertical resolution, the edges of the defect were not reconstructed accurately. Additionally, since the EM logging tool 100 is omni-directional, the amount of metal loss estimated by EM logging tool 100 (e.g., referring to FIG. 1) is an underestimate of the true metal loss. Once the high-resolution log, shown in FIGS. 12A and 12B, from the database formed in workflow 500 is added, the resolution of the inverted pipe thickness is improved. The edges of a corrosion area are sharpened as shown in FIGS. 13A and 13B. This may allow for predicting the azimuthal distribution of the defect.

Improvements from the methods and systems described above include using the high-resolution log to refine the electromagnetic log and recreating a more detailed map of one or more pipes in a wellbore. This map may be utilized at any time to provide an accurate prediction of pipe condition by running electromagnetic tool only and comparing the measurements from the electromagnetic tool to the map. Thus, it improves the vertical resolution within a foot level and enable electromagnetic tool to improve azimuthal resolution.

This method and system for determining corrosion along a tubular in a wellbore may include any of the various features of the compositions, methods, and system disclosed herein, including one or more of the following statements.

Statement 1: A method for estimating a pipe property for a plurality of nested tubulars may comprise disposing an electromagnetic (EM) logging tool in a wellbore. The EM logging tool may comprise a transmitter disposed on the EM logging tool and a receiver disposed on the EM logging tool. The method may further comprise transmitting an electromagnetic field from the transmitter into one or more tubulars to energize the one or more tubulars with the electromagnetic field thereby producing an eddy current that emanates from the one or more tubulars. Additionally, the method may include measuring the eddy current in the pipe string with the receiver on at least one channel to obtain a plurality of measurements, forming an EM log from the plurality of measurements, forming a relationship between the EM log and a database, wherein the database is formed from one or more high-resolution measurements, and producing a mapping function between the EM log and the database.

Statement 2. The method of statement 1, wherein the one or more high-resolution measurements are for each of the one or more tubulars.

Statement 3. The method of statement 2, wherein the one or more high-resolution measurements characterize each of the one or more tubulars.

Statement 4. The method of statement 3, combining known pipe nominal outer dimensions and thickness with the one or more high-resolution measurements.

Statement 5. The method of statements 1 or 2, wherein the relationship between the EM log data and the database is formed using a deep neural network (DNN).

Statement 6. The method of statement 5, wherein the DNN forms the mapping function from the relationship between the EM log data and the database.

Statement 7. The method of statements 1, 2, or 5, further comprising identifying corrosion on the one or more tubulars using the mapping function.

Statement 8. The method of statement 7, further comprising removing or repairing the one or more tubulars that have the corrosion.

Statement 9. The method of statements 1, 2, 5, or 7, further comprising identifying a thickness of the one or more tubulars using the mapping function.

Statement 10. The method of statement 9, further comprising removing or repairing the one or more tubulars that have corrosion identified by the thickness of the one or more tubulars.

Statement 11. A method for estimating a pipe property for a plurality of nested tubulars may comprise disposing an electromagnetic (EM) logging tool in a wellbore. The EM logging tool may comprise a transmitter disposed on the EM logging tool and a receiver disposed on the EM logging tool. The method may further comprise transmitting an electromagnetic field from the transmitter into one or more tubulars to energize the one or more tubulars with the electromagnetic field thereby producing an eddy current that emanates from the one or more tubulars. Additionally, the method may include, measuring the eddy current in the one or more tubulars with the receiver on at least one channel to obtain a plurality of measurements, inputting the plurality of measurements through a mapping function, and estimating high-resolution measurements for the one or more tubulars.

Statement 12. The method of statement 11, further comprising taking one or more high-resolution measurements with a high-resolution tool.

Statement 13. The method of statement 12, wherein the one or more high-resolution measurements characterize each of the one or more tubulars.

Statement 14. The method of statement 13, further comprising combining known pipe nominal outer dimensions and thickness with the one or more high-resolution measurements.

Statement 15. The method of statement 13, wherein the high-resolution tool is a flux leakage tool, an ultrasonic tool, or a mechanical caliper tool.

Statement 16. The method of statement 13, further comprising creating a resolution-enhanced corrosion map that includes one or more tubular properties using the mapping function, wherein the one or more tubular properties includes a thickness.

Statement 17. The method of statement 16, further comprising identifying corrosion on the one or more tubulars using the resolution-enhanced corrosion map.

Statement 18. The method of statement 16, further comprising predicting an azimuthal distribution of an anomaly using the resolution-enhanced corrosion map.

Statement 19. The method of statement 11 or 12, further comprising identifying a thickness of the one or more tubulars using the mapping function and removing or repairing the one or more tubulars that have corrosion identified by the thickness of the one or more tubulars.

Statement 20. The method of statement 11, 12, or 19, further comprising predicting a thickness of the one or more tubulars using a second set of one or more electromagnetic measurements from the EM logging tool.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a–b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for estimating a pipe property for a plurality of nested tubulars comprising:
disposing an electromagnetic (EM) logging tool in a wellbore, wherein the EM logging tool comprises:
a transmitter disposed on the EM logging tool; and
a receiver disposed on the EM logging tool;
transmitting an electromagnetic field from the transmitter into one or more tubulars to energize the one or more tubulars with the electromagnetic field thereby producing an eddy current that emanates from the one or more tubulars;
measuring the eddy current in the pipe string with the receiver on at least one channel to obtain a plurality of measurements;
forming a first EM log from the plurality of measurements;
forming a relationship between the first EM log and a database, wherein the database is formed from one or more high-resolution measurements;

producing a mapping function between the first EM log and the database; and applying the mapping function to a second EM log to improve azimuthal resolution of the second EM log.

2. The method of claim 1, wherein the one or more high-resolution measurements are for each of the one or more tubulars.

3. The method of claim 2, wherein the one or more high-resolution measurements characterize each of the one or more tubulars.

4. The method of claim 3, combining known pipe nominal outer dimensions and thickness with the one or more high-resolution measurements.

5. The method of claim 1, wherein the relationship between the first EM log data and the database is formed using a deep neural network (DNN).

6. The method of claim 5, wherein the DNN forms the mapping function from the relationship between the first EM log data and the database.

7. The method of claim 1, further comprising identifying corrosion on the one or more tubulars using the mapping function.

8. The method of claim 7, further comprising removing or repairing the one or more tubulars that have the corrosion.

9. The method of claim 1, further comprising identifying a thickness of the one or more tubulars using the mapping function.

10. The method of claim 9, further comprising removing or repairing the one or more tubulars that have corrosion identified by the thickness of the one or more tubulars.

11. A method for estimating a pipe property for a plurality of nested tubulars comprising:

disposing an electromagnetic (EM) logging tool in a wellbore, wherein the EM logging tool comprises:
a transmitter disposed on the EM logging tool; and
a receiver disposed on the EM logging tool;

transmitting an electromagnetic field from the transmitter into one or more tubulars to energize the one or more tubulars with the electromagnetic field thereby producing an eddy current that emanates from the one or more tubulars;

measuring the eddy current in the one or more tubulars with the receiver on at least one channel to obtain a first plurality of measurements;

inputting the first plurality of measurements through a mapping function; estimating high-resolution measurements for the one or more tubulars; and applying the mapping function and the high-resolution measurements to a second plurality of measurements to improve azimuthal resolution of the second plurality of measurements.

12. The method of claim 11, further comprising taking one or more high-resolution measurements with a high-resolution tool.

13. The method of claim 12, wherein the one or more high-resolution measurements characterize each of the one or more tubulars.

14. The method of claim 13, further comprising combining known pipe nominal outer dimensions and thickness with the one or more high-resolution measurements.

15. The method of claim 13, wherein the high-resolution tool is a flux leakage tool, an ultrasonic tool, or a mechanical caliper tool.

16. The method of claim 13, further comprising creating a resolution-enhanced corrosion map that includes one or more tubular properties using the mapping function, wherein the one or more tubular properties includes a thickness.

17. The method of claim 16, further comprising identifying corrosion on the one or more tubulars using the resolution-enhanced corrosion map.

18. The method of claim 16, further comprising predicting an azimuthal distribution of an anomaly using the resolution-enhanced corrosion map.

19. The method of claim 11, further comprising identifying a thickness of the one or more tubulars using the mapping function and removing or repairing the one or more tubulars that have corrosion identified by the thickness of the one or more tubulars.

20. The method of claim 11, further comprising predicting a thickness of the one or more tubulars using a second set of one or more electromagnetic measurements from the EM logging tool.

* * * * *